United States Patent
Ge et al.

(10) Patent No.: US 7,471,647 B2
(45) Date of Patent: Dec. 30, 2008

(54) BRIDGED NETWORK SPANNING TREE ABNORMALITY DETECTION

(75) Inventors: An Ge, Plano, TX (US); Girish Chiruvolu, Plano, TX (US); Maher Ali, Richardson, TX (US)

(73) Assignee: Alcatel Lucent, Paris (FR)

( * ) Notice: Subject to any disclaimer, the term of this patent is extended or adjusted under 35 U.S.C. 154(b) by 672 days.

(21) Appl. No.: 11/118,136

(22) Filed: Apr. 29, 2005

(65) Prior Publication Data
US 2006/0245376 A1  Nov. 2, 2006

(51) Int. Cl.
*H04L 12/28* (2006.01)
*H04L 12/56* (2006.01)

(52) U.S. Cl. .................. 370/256; 370/252; 709/238
(58) Field of Classification Search .............. 370/238, 370/252, 254–258, 389; 709/238–242
See application file for complete search history.

(56) References Cited

U.S. PATENT DOCUMENTS 6,721,275 B1 * 4/2004 Rodeheffer et al. ......... 370/238
6,987,740 B1   1/2006 Di Benedetto et al.
2005/0071672 A1   3/2005 Fung
2005/0169193 A1 * 8/2005 Black et al. ................. 370/254

OTHER PUBLICATIONS

Ruffen T Len J Yanacek Cabeltron Systems Incorporated, Cabletron's SecureFast VLAN Operation Model Version 1.8; rfc2643.txt, IETF Starndard, Internet Engineering Task Force, IETF, CH, Aug. 1999, XP015008426.
Collaboration: 1990, Report No. IEEE Std 802.1D-1990, Inst. Electr. & Electron. Eng., New York, NY USA (Chapter 4) XP002388815.
Sean Whalen & Matt Bishop: "Layer 2 Authentication", Internet, [Online], Feb. 25, 2005, pp. 1-12, XP002387477, Univ. of California, Davis, USA retrieved from the Internet: URL: http://www.node99.org/projects/l2auth/l2auth.pdf> [retrieved on Jun. 27, 2006].

* cited by examiner

*Primary Examiner*—John Pezzlo (57) ABSTRACT

A bridged network system (10, 10'). The system comprises a plurality of bridge nodes ($BRN_x$). Each bridge node in the plurality of bridge nodes is connected to communicate with at least one other neighboring bridge node in the plurality of nodes. Each bridge node in the plurality of bridge nodes comprises circuitry ($BP_{y,z}$) for communicating with at least one of either another bridge node in the plurality of nodes or a network server. Each bridge node in the plurality of bridge nodes further comprises circuitry for storing (neighbor-tracking table), as received from the at least one of another bridge node in the plurality of nodes and the network server, at least one spanning tree parameter of a neighboring bridge node.

16 Claims, 3 Drawing Sheets

30 — AWAIT NEW BRIDGE NODE CONNECTION TO TRUSTED NETWORK

32 — NETWORK SERVER DETERMINES SPANNING TREE PARAMETERS (E.G., PPC) FOR NEW BRIDGE NODE

34 — NETWORK SERVER COMMUNICATES SPANNING TREE PARAMETERS FOR NEW BRIDGE NODE TO NEW BRIDGE NODE AND NEIGHBORING BRIDGE NODE OPERATING AS AUTHENTICATOR

FIG. 3

BRIDGED NETWORK SPANNING TREE ABNORMALITY DETECTION

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present embodiments relate to bridged computer networks and are more particularly directed to detecting certain abnormalities such as in a network spanning tree.

Bridged networks have found favor in many applications in the networking industry for various reasons. A bridged network generally includes a number of nodes, some of which are bridge nodes and which have connectivity to other nodes in the network. During network learning, each bridge node typically broadcasts on all of its ports, that is, the bridge node transmits the same message data out of all of its ports, where such message data typically includes the network topology information. In this manner, when another bridge node receives a message that contains topology information, the receiving node does not forward the message; instead, it compares with its distance to the root and decides whether to inform the other bride nodes about this new information with its own ID. Thus, the topology messages are akin to regenerated messages with proper local information, where those regenerated messages may be forwarded to other bridge nodes. After repeating this process with numerous messages and as between various bridge nodes, each bridge node is informed of its connectivity to other neighboring bridge nodes, where in this document the term neighbor (or neighboring) node is intended to mean two bridge nodes that each have a port directly connected to the other. This connectivity information is maintained by each bridge node in one or more respective tables that record information received, or derived from, bridge nodes that replied during the learning process. In addition to bridge nodes, the bridged network includes other nodes, which are referred to with varying names such as user stations or client nodes. With the connectivity of the bridge nodes and client nodes, one or more bridge nodes connect two or more client nodes together and forward messages between the client nodes. Thus, the client nodes communicate with each other as if they are directly attached to the same physical network and with transparency of the bridge node(s) between them.

Within a bridged network, an additional layer of routing may be imposed. As one example, such routing is imposed with one or more spanning trees that thereby define the path along which messages may be communicated within the bridged network. Thus, each spanning tree imposes an additional level of routing restraint for a message communicated along that tree. Typically such restraints are imposed to prevent looping of a network message, that is, preventing multiple copies of a same message from reaching a same bridge node, as could otherwise occur if a loop exists in the physical connectivity of the network. For example, consider a ring of bridge nodes, wherein each bridge node is connected to another bridge node and the entirety of the bridge nodes forms a ring. Without an additional constraint, if one bridge node in the ring broadcasts a message, and assuming all nodes pass onward the broadcast message along the ring, then two copies of the broadcast message will reach (or "loop" to) the destination node in that ring. A spanning tree, however, defines a route as between the bridge nodes, and may be implemented in the ring as merely an imposed block between two bridge nodes on the ring. Thus, when a bridge node adjacent the block receives a message, it is prevented from transmitting the message onward in the direction of the block. As a result, only one copy of the broadcast message may reach the destination node.

By way of additional background, the prior art includes a different bridge priority assigned to each bridge node, and the priority affects the time for re-convergence when a failure (e.g., breakage) occurs in the bridged network. In general, when a failure occurs, control messages are communicated among the bridge nodes that are still connected within the spanning tree in a process known as re-convergence. For example, each control message in one approach is known as a bridge protocol data unit ("BPDU"), which is a message that is exchanged across the bridges nodes and contains information including ports, addresses, and priorities, all of which are used to direct the message to the proper destination. Thus, when a bridge node receives a BPDU in the prior art, the node may update its table information and thereby make changes in the network configuration. Indeed, once re-convergence is complete, a new spanning tree is thereby established based on changes that were made by bridges that received BPDUs during re-convergence. As a result, additional messages may be communicated along the new spanning tree, at least until the failure, which caused the re-convergence, is resolved.

By way of further background, a BPDU also typically includes so-called port path cost ("PPC") of the bridge node that generated the BPDU. PPC is an efficiency measure of the cost of transmitting along the path from the specified port of the bridge node that generated the BPDU to the "root" bridge node in the spanning tree. This cost is typically indicated in a value of the hop distance from the port at issue to the root bridge node, that is, the number of bridge nodes between the port at issue and the root. Thus, if the port at issue is connected directly to the root bridge node, then the hop distance is one, whereas if the port at issue is connected through one intermediate bridge node to the root bridge node, then the hop distance is two, and so forth. Also in this regard, the root bridge node is a node that is typically given some level of control over the spanning tree, such as by identifying the root node as having the highest priority in the spanning tree, and the root node has access to a network server and database for various purposes of overseeing the spanning tree.

By way of still further background, note that during network learning or re-convergence, each bridge node receives from the network server the bridge node's respective PPC (or hop distance) to the root bridge node. However, during subsequent operation, the same bridge node may again receive a BPDU from a neighboring bridge node, wherein the neighboring bridge node indicates a change in its own PPC. For example, the neighboring bridge node may indicate to the receiving bridge node that the neighboring bridge node has become the root of the spanning tree, wuch as by indicating a PPC of zero. In response, therefore, the receiving bridge node will possibly alter its own configuration, detecting in essence that it is now connected directly to the root bridge node, thereby giving itself a hop distance of one to that root now-neighboring bridge node. Still further, that same receiving bridge node may then communicate its own BPDU to other bridge nodes in the network, notifying them of the now perceived direct-connection to the root bridge note, whereupon it is possible that some of those other bridge nodes may in turn change their own network information as pertaining to the PPC of each such node. Indeed, the changed PPCs may result in an overall change to the spanning tree configuration of the network.

While the preceding technologies have proven beneficial in numerous applications, the present inventors have recognized that drawbacks may occur in the above-described operation in connection with certain types of network abnormalities. For example, an unfortunate reality of contemporary computing is that often users are seeking unauthorized access to computers, and such users are known to attempt to "spoof" in the networking environment, that is, to connect to the network and have their station held out as an authorized network node when in fact it is not. Indeed, such a wrongdoer may seek to connect as a user station yet mimic the behavior of a root network bridge in order to have the access and control that is normally afforded the true root network bridge. To facilitate such an effort, the wrongdoer may cause its user station to issue a BPDU asserting that it is a bridge node and that it has achieved a status of the root bridge node, thereby putting it in a position to receive various information from the other bridge nodes. As another example, an error in a BPDU such as which may be inserted due to an error by an actual bridge node also may cause wrongful information to be circulated to other bridge nodes. In either case, therefore, the other bridge nodes of the network receive the BPDU and may alter their own tabled information in response and also may cause a change to the network configuration in response. Clearly, such changes are undesirable to the extent they cause network changes in response to wrongful information, whether it be propagated by mistake or wrongful intent.

With the above drawbacks, certain solutions to improve spanning tree protocol ("STP") have been proposed in the prior art. For example, BPDU guard enhancement has been introduced to enhance the STP security by clearly defining the domain borders. Once the BPDU guard is enabled at a port, the port will become disabled if a BPDU is received from the port. This way, any devices that are behind the ports with BPDU guard enabled are not allowed to participate the STP. As a result, active Ethernet topology is stable. As another example, there is a root guard technique. In this technique, root guard is configured on a per-port basis and does not allow the port to become an STP root port. This means that the port is always STP-designated, and if there is a better BPDU received on this port, BPDU guard disables the port, rather than taking the BPDU into account and electing a new STP root. Root guard needs to be enabled on all ports where the root bridge should not appear. As yet another example, encryption algorithms (e.g., MACSec) can be used in the Ethernet. In order to achieve a secure STP, the BPDU messages need to be encrypted.

While the above approaches may assist in various circumstances, they do not protect the STP from bridge malfunction. The port guard only protects the user port. Root guard requires a manual setup and is not flexible or scalable. The MACSec approach requires expensive encryption and a network wide upgrade. Accordingly, greater optimization and application are required, as is achieved by the preferred embodiments, which are further detailed below.

BRIEF SUMMARY OF THE INVENTION

In one preferred embodiment, there is a bridged network system. The system comprises a plurality of bridge nodes. Each bridge node in the plurality of bridge nodes is connected to communicate with at least one other neighboring bridge node in the plurality of nodes. Each bridge node in the plurality of bridge nodes comprises circuitry for communicating with at least one of either another bridge node in the plurality of nodes or a network server. Each bridge node in the plurality of bridge nodes further comprises circuitry for storing, as received from the at least one of another bridge node in the plurality of nodes and the network server, at least one spanning tree parameter of a neighboring bridge node.

Other aspects are also described and claimed.

DETAILED DESCRIPTION OF THE INVENTION

Figure 1:
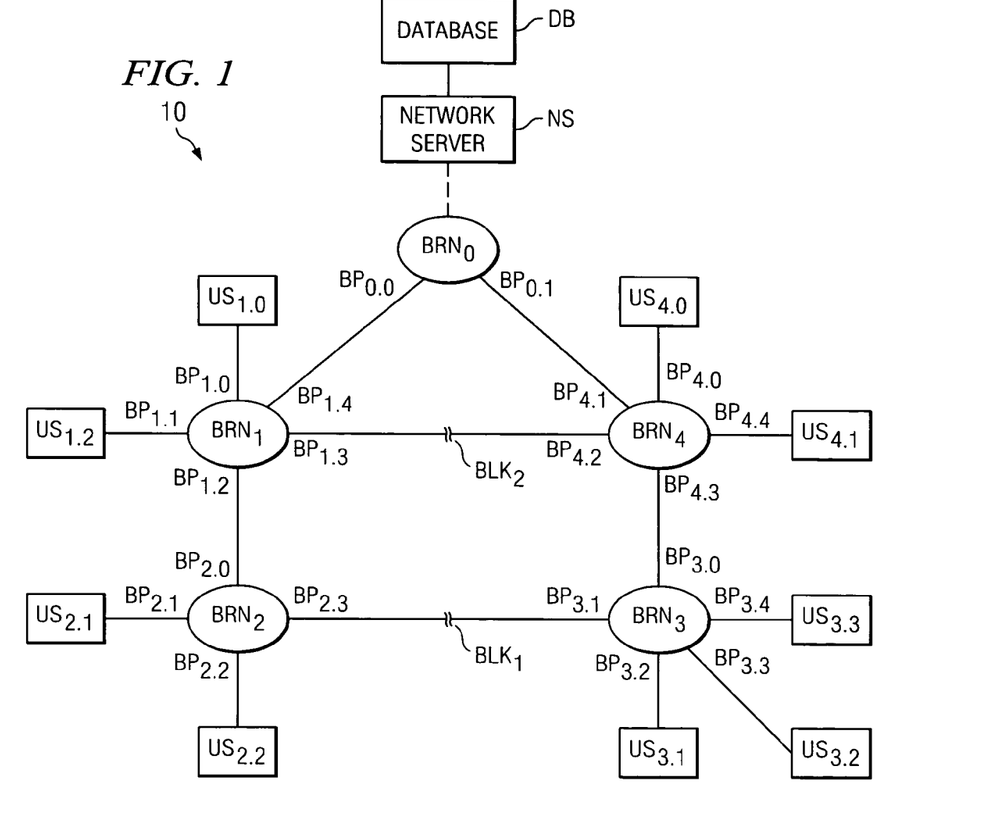
FIG. 1 illustrates a network system designated generally at 10 and as an example of the preferred embodiments.

FIG. 1 illustrates a network system designated generally at 10 and as an example of the preferred embodiments. In general at the level illustrated in FIG. 1, each item in system 10 is known in the art, where the nodes shown therein may be constructed using various forms of hardware and software programming to perform steps consistent with the discussions in this document. However, as detailed later, the methodology of operation as well as certain functions added to the bridge nodes provide for the preferred embodiments and operate to improve system 10 as a whole, and such methodology and functionality may be readily added into the existing hardware and software programming of a system such as system 10. Indeed, as a result, the preferred embodiments are flexible and scalable to different sized networks. System 10 generally represents a bridged network such as a Metro Ethernet network that includes a number of Metro nodes, which also may be referred to as Ethernet switches. Note that the physical connections between nodes in system 10 may be referred to in various manners and may be achieved in various ways, but in any event they permit bi-directional communication between each group of two connected nodes. Communication is by blocks of data, often referred to as messages, frames, or packets. Moreover, within the core network and as also known in the art, an additional layer of routing may be imposed, such as with one or more spanning trees that thereby define the path along which messages are communicated within the core network for communication along a given spanning tree. Indeed, the connectivity of FIG. 1 is intended to illustrate such a spanning tree, with it understood that such connectivity is therefore both physical and logical in form, where additional physical connections may exist but are not shown because they are not part of the present spanning tree.

Looking then to system 10 in general, it includes five bridge nodes $BRN_0$ through $BRN_4$, where bridge node $BRN_0$ is assumed in the example shown to be the root bridge node. Typically, therefore, as a root, bridge node $BRN_0$ would have the highest priority, which often is presented to all nodes in system 10 by each bridge node having a respective bridge ID or bridge priority number, where that ID or number represents each node's respective priority, including the one ID (or priority) that thereby identifies which bridge node is the root. In any event, as the root, bridge node $BRN_0$ is coupled to a network server NS, which for reasons more clear below is sometimes referred to as an authentication server and that is coupled to a database DB. The coupling from bridge node $BRN_0$ to network server NS is shown by way of a dashed line because in actuality all bridge nodes in system 10 may communicate with network server NS, although the explicit coupling to bridge node $BRN_0$ is shown in FIG. 1 simply because in that example bridge node $BRN_0$ is the root node. In addition, while not shown, a network administrator (or "network manager") also may have access to network server NS for various reasons, including the ability to input certain spanning tree parameters, such as root ID and alternative root ID, and for authentication usage, as further appreciated later. In any event, bridge priority, once stored in each node, provides control following a failure in system 10.

In system 10, each bridge node $BRN_x$ is also coupled to one or more other bridge nodes, via a respective port. For example, bridge node $BRN_0$ is coupled to bridge node $BRN_1$ via a port $BP_{0.0}$, and bridge node $BRN_0$ is also coupled to bridge node $BRN_4$ via a port $BP_{0.1}$. Note that the coupling of bridge nodes as shown may be by direct connection or there could be intermediate nodes that are merely routing nodes and do not have the functionality of a bridge node, where typically such intermediate nodes are not included in the hop distance measurement between bridge nodes. In any event, from the illustration of FIG. 1, one skilled in the art will appreciate the remaining couplings between bridge nodes in FIG. 1, which along with the above-discussed couplings are summarized in the following Table 1:

TABLE 1

| Bridge Node | Coupled bridge nodes |
| --- | --- |
| $BRN_0$ | $BRN_1$, via port $BP_{0.0}$ |
|  | $BRN_4$, via port $BP_{0.1}$ |
| $BRN_1$ | $BRN_0$, via port $BP_{1.4}$ |
|  | $BRN_2$, via port $BP_{1.2}$ |
| $BRN_2$ | $BRN_1$, via port $BP_{2.0}$ |
| $BRN_3$ | $BRN_4$, via port $BP_{3.0}$ |
| $BRN_4$ | $BRN_0$, via port $BP_{4.1}$ |
|  | $BRN_3$, via port $BP_{4.3}$ |

Continuing with system 10, for sake of example several of the bridge nodes are also shown as connected to user station nodes $US_{y.z}$, which may be referred to by other names such as a customer nodes or customer stations. The user station nodes are examples of nodes that may be implemented in the global Internet or at remotely located networks, such as at different physical locations of a business entity. Typically, therefore, it is desirable for certain user station nodes to communicate with others, and a key function therefore of the bridge nodes is to facilitate such communication in a fashion that is not intrusive or even discernable to the user nodes. As a result, one user station in system 10 may communicate with another user station in system 10 across great distances with transparency of the network layers and nodes between them. The connectivity of the example of user stations in FIG. 1 is summarized in the following Table 2:

TABLE 2

| Bridge Node | Coupled user station nodes |
| --- | --- |
| $BRN_0$ | None |
| $BRN_1$ | $US_{1.0}$, via port $BP_{1.0}$ |
|  | $US_{1.2}$, via port $BP_{1.1}$ |
| $BRN_2$ | $US_{2.1}$, via port $BP_{2.1}$ |
|  | $US_{2.2}$, via port $PB_{2.2}$ |

TABLE 2-continued

| Bridge Node | Coupled user station nodes |
| --- | --- |
| $BRN_3$ | $US_{3.1}$, via port $BP_{3.2}$ |
|  | $US_{3.2}$, via port $BP_{3.3}$ |
|  | $US_{3.3}$, via port $BP_{3.4}$ |
| $BRN_4$ | $US_{4.0}$, via port $BP_{4.0}$ |
|  | $US_{4.1}$, via port $BP_{4.4}$ |

System 10 also includes blocks $BLK_x$ to impose an additional layer of routing control, as introduced above in the Background Of The Invention section of this document. In the present example, let that routing control be a spanning tree that thereby defines the path along which messages may be communicated within the bridged network. For example, a block $BLK_1$ is shown between bridge nodes $BRN_2$ and $BRN_3$. As a result of block $BLK_1$, bridge node $BRN_2$ may not communicate to $BRN_3$ without the communication passing through at least one other bridge node in system 10. For example, the path of communication from bridge node $BRN_2$ to $BRN_3$ spans a hop distance of four bridge nodes via $BRN_1$, $BRN_0$, $BRN_4$, and to $BRN_3$. In a similar manner, a block $BLK_2$ is shown between bridge nodes $BRN_1$ and $BRN_4$. As a result of block $BLK_2$, bridge node $BRN_1$ may not communicate to $BRN_4$ without the communication passing through at least one other bridge node in system 10. For example, the path of communication from bridge node $BRN_1$ to $BRN_4$ spans a hop distance of two bridge nodes via $BRN_0$ to $BRN_4$.

Having now introduced system 10, note that under proper operation, the spanning tree topology is created by control message (e.g., Bridge Protocol Data Unit—"BPDU") negotiations among the bridge nodes when they are booting up or upon reset. As shown in system 10, one bridge node (e.g., $BRN_0$) is elected as the root. Also during this process, the remaining bridge nodes each find the lowest cost path to the root node and block the other redundant data paths (e.g., blocks $BLK_1$ and $BLK_2$), thereby creating the overall spanning tree. However, an abnormality of the spanning tree protocol may be caused by various reasons, such as a malicious user who spoofs system 10 by asserting false information in the BPDU or by a bridge node malfunction. For example with respect to the former, supposed that a user of user station $US_{3.1}$ seeks unauthorized access to network information; such access may be sought by way of having user station $US_{3.1}$ issue false data in the form of a supposed BPDU whereby user station $US_{3.1}$ holds itself out as a root bridge node, when in fact it is a user station. Were this attempt to be successful, other bridge nodes would re-converge and quite possibly the spanning tree would be altered such as by re-locating one or both of blocks $BLK_1$ and $BLK_2$, also giving access to user station $US_{3.1}$ that is not intended for proper and authorized network operation. Thus, as a result of such an attempt or of a bridge node malfunction, when the spanning tree protocol does not converge correctly, loops may be formed in the mesh network or an attacker can take advantage of the situation to eavesdrop on the network traffic and launch a denial of service ("DoS") attack. The preferred embodiments, however, seek to reduce or eliminate these possibilities, as further explored below.

Figure 2:
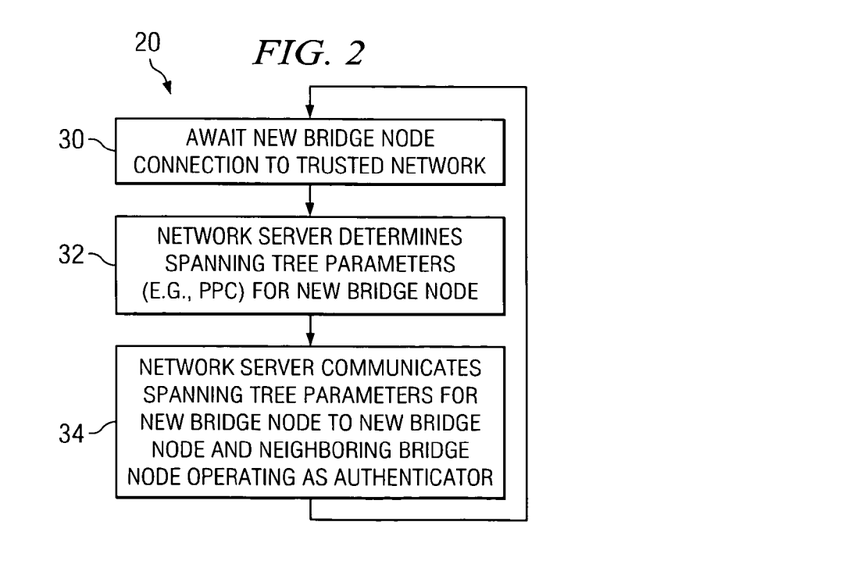
FIG. 2 illustrates a flowchart method 20 to depict functionality that is included with system 10 according to a preferred embodiment.
Figure 3:
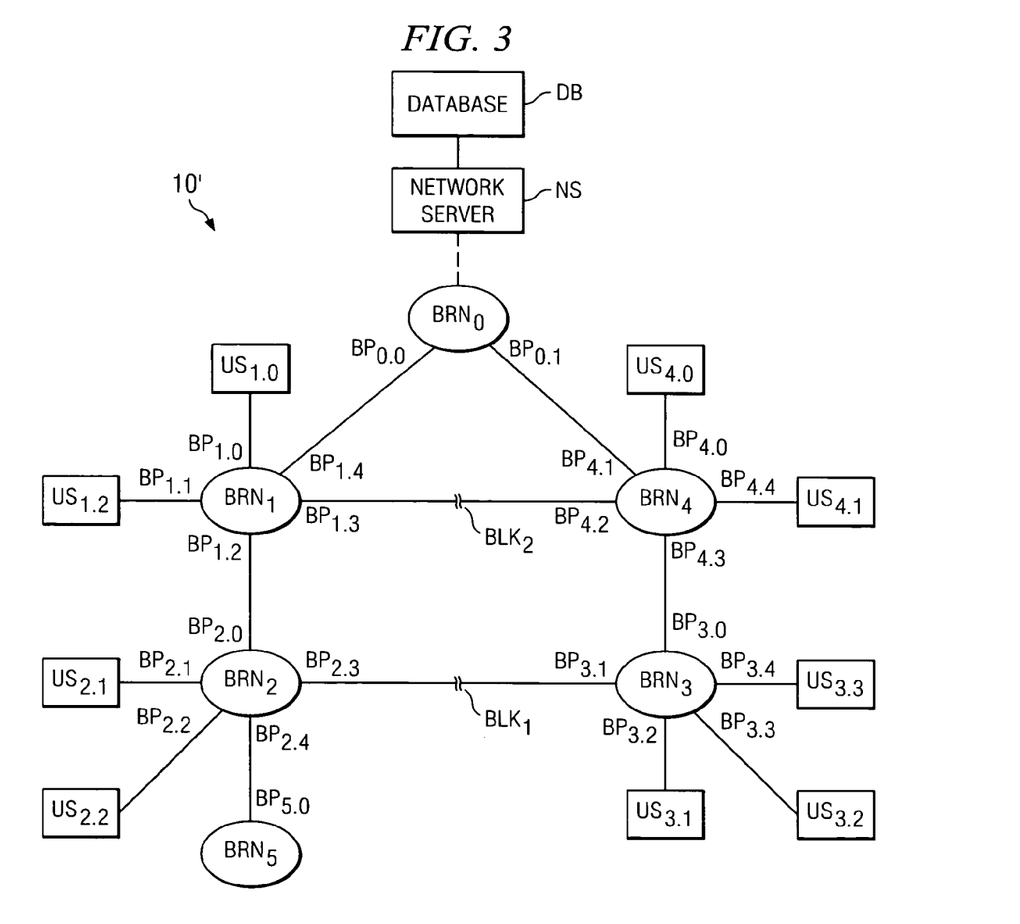
FIG. 3 illustrates a system 10' that is the same as system 20 of FIG. 1 with one modification.

FIG. 2 illustrates a flowchart method 20 to depict functionality that is included with system 10 according to a preferred embodiment and that is also explained by way of example in connection with FIG. 3, which illustrates a system 10' that is the same as system 20 of FIG. 1 with one modification. Particularly, in FIG. 3, an additional bridge node $BRN_5$ is shown connected to system 10, with various implications related thereto as described in the remainder of this document. In this added node example, therefore, bridge nodes $BRN_2$ and $BRN_5$ are neighbor or neighboring nodes as defined earlier, where in this example they are such because bridge node port $PB_{2.4}$ is directly connected to bridge node port $BP_{5.0}$, so that these bridge nodes may communicate a message(s) directly to one another without the message(s) passing though one or more intermediate bridge nodes.

By way of introduction, note that in addition to method 20 various other functions as known in the art may be performed by system 10 as a whole or by one or more of its components, where method 20 therefore does not show such additional steps so as to focus on the novel aspects of the preferred embodiment In method 20, a first step 30 applies to each bridge node $BPN_x$ wherein the respective node awaits a new bridge connection to the trusted network. By using the term trusted network, it is supposed that some steady state has been reached whereby a network such as system 10 has a certain number of bridge nodes, each of which that has been connected via one or more ports via respective links to other nodes in the network, where each of those connections is verified as permissible in a process that is often referred to as "authentication," as further detailed below. By way of example, therefore, assume in FIG. 1 that each illustrated bridge node has been authenticated and, thus, the entirety of those bridge nodes constitutes the trusted network at that point When a new bridge node link is established, then method 20 continues from step 30 to step 32. This may occur when a bridge node already in the network by way of one more links seeks to establish yet another link to an another bridge node already in the network or where a new bridge node, not previously connected to the network, is first connected to the network. By way of illustrating this latter example, in FIG. 3 recall that bridge node $BRN_5$ is newly-added as between systems 10 and 10' and has established a new link from its port $BP_{5.0}$ to port $BP_{2.4}$ of bridge node $BRN_2$. In response, step 32 operates as known in the art. Specifically, when a new bridge node link is connected to an existing bridge node, the above-introduced authentication process commences, whereby the genuineness of the new connection is verified. Particularly, the existing bridge node to which the new link is connected becomes as authenticator with respect to the new bridge node, and the new bridge node or the port on the bridge node of a new link is a supplicant. The supplicant, in effect, requests to the authenticator an authentication which, if granted, permits the supplicant link to join the trusted network. In response to the supplicant's request, the authenticator communicates with network server NS. Thus, in the example of FIG. 3, port $BP_{2.4}$ of bridge node $BRN_2$ becomes an authenticator for the supplicant port $BP_{5.0}$ of bridge node $BRN_5$ and, hence, bridge node $BRN_2$ communicates along a different port a responsive request to network server NS and database DS (via one or more intermediate bridge nodes, such as via $BRN_0$ in this example). Assuming various information is properly presented in this request, then network server NS per the prior art determines the spanning tree parameters for the new link, that is, sufficient information so as to include the new link that includes the requesting node port in the present or a newly-converged spanning tree. These parameters include an indication of the present root ID that thereby identifies the present root bridge node, which here is node $BRN_0$, as well as the port path cost ("PPC") of the bridge node port that generated the request, where here that requesting port is port $BP_{5.0}$ of bridge node $BRN_5$. Recall from the Background section of this document that PPC is an efficiency measure of the cost of transmitting along the path from the specified port of the bridge node that generated the BPDU to a certain location such the "root" bridge node in the spanning tree. Thus, assuming that each illustrated port-to-port link has a PPC of length one, then the PPC will be determined for the supplicant port $BP_{5.0}$ of bridge node $BRN_5$ as equal to three.

After the PPC determination is made in step 32, method 20 continues to step 34. Here, per the prior art, the spanning tree parameters, including that PPC and the present root node ID, are communicated from network server NS back to the supplicant bridge node, which stores that PPC for purposes of future network operations. Note that this information is preferably communicated via an authenticator bridge node, which in the example of FIG. 3 is bridge node $BRN_2$. Further to the preferred embodiments, however, the present root node ID and the PPC information of the supplicant bridge node are not only passed on by the authenticator bridge node to the supplicant, but preferably that same information is also stored and maintained by the authenticator bridge node. In other words, according to the preferred embodiments, the spanning tree parameters as will be given to a new-link-requesting bridge node port are not only stored by that requesting bridge node for which the PPC applies, but it is also stored by the neighboring node that operates as the authenticator in a way that the neighboring node may attribute or track those parameters to the new-link-requesting bridge node—for the sake of reference and consistency in this document but without limitation, let the storage by the neighboring node be referred to as storing in a neighbor-tracking table, that is, this information as stored in a memory or the like of one node (e.g., authenticator) initially tracks the information as actually pertaining and sent to the neighboring (e.g., supplicant) node. The actual physical neighbor-tracking table of each bridge node is not shown so as to simplify the illustration, but one skilled in the art will readily appreciate that the hardware of such devices will readily have access to memory stores. In any event, in addition, other information intended for the requesting supplicant bridge node also may be stored by the neighboring authenticator bridge node. The reasons for and use of this stored information are detailed later.

Having demonstrated the communication and storage of spanning tree parameters to a supplicant bridge node as well as to the authenticator node that authenticates that supplicant bridge node, note that method 20 preferably applies as each bridge node or node port connection is added to a trusted network. As a result, each time a new link is established, the bridge node port requesting connection via a new link will be informed of its PPC and the then-existing root node ID, as will its neighboring bridge (i.e., the authenticator bridge immediately connected to the requesting bridge node). Thus, over time and as the number of links in a network grows along with the implementation of the preferred embodiments, then each bridge node will have stored its own PPC value(s) as well as those for any neighboring node to which it is directly connected, where such a direct connection includes an immediate bridge-to-bridge connection or when one bridge is coupled to another bridge through one or more transparent non-bridge nodes, in which case in the latter the two bridge nodes are logically still directly-connected. Various benefits arise from this dissemination of PPC and root node ID information, as is further apparent below.

Figure 4:
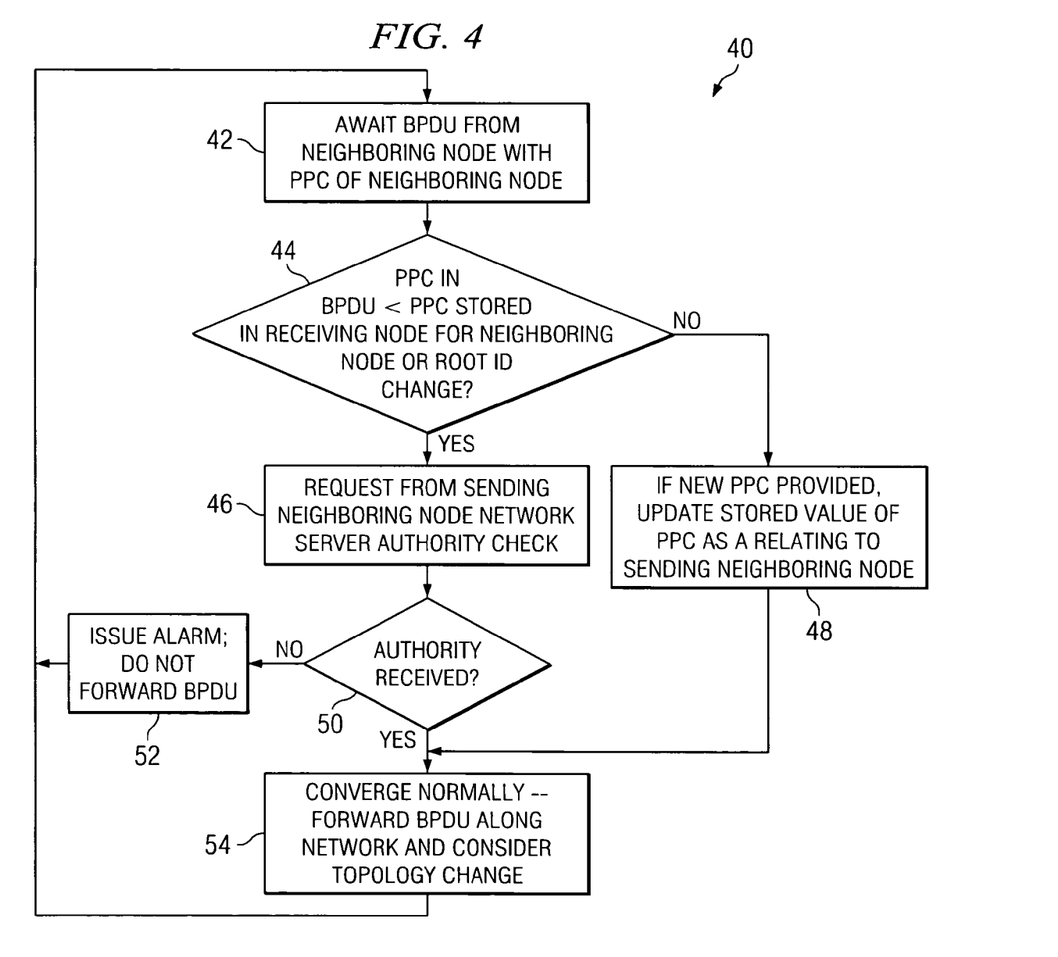
FIG. 4 illustrates a flowchart method 40 to depict additional functionality that is included with systems 10 or 10' introduced above.

FIG. 4 illustrates a flowchart method 40 to depict additional functionality that is included with systems 10 or 10' introduced above, and that also will be explained by way of example in connection in FIG. 3 with it understood that it applies equally to FIG. 1. As with portions of method 20, method 40 preferably applies to each bridge node in systems 10 and 10'. After a bridge node has joined the trusted network and spanning tree convergence occurs, it is anticipated that at some future point that bridge node will again transmit a control message (e.g., BPDU) with what it is asserting as spanning tree parameters, that is, it will include what it is stating or proposing as the network root node ID and its own PPC. Thus, step 42 of method 40 represents a wait state wherein each bridge node may serve other functions such as routing network traffic and the like, while also awaiting such a BPDU from any other bridge node in the network.

When a BPDU is received by a bridge node from a neighboring bridge node, then method 40 continues from step 42 to step 44. By way of introduction to the step 44 response, note that such a BPDU may be received for various reasons. As a first set of examples, certain ordinary and proper events may arise and may cause the issuance of a BPDU such as a new link may be sought in systems 10 and 10' or a malfunction may have occurred such as a failed link. However, as a second and contrary set of examples, certain improper events may occur such as where the BPDU represents an illicit effort by a node to gain improper access to or control of part of the resources of systems 10 and 10'. In any event and as now demonstrated, step 44 begins a process to discern and distinguish the first example set from the second example set. In general, step 44 directs flow based on which of these two sets it perceives is represented by the received BPDU, where the determination is made by examining one or more spanning tree parameters in the received BPDU. In the preferred embodiment, this perception is developed by queries directed to two spanning tree parameters, and at least for sake of easing the present explanation, each query is separately discussed below.

In a first query, step 44 at the BPDU-receiving node compares the PPC in the received BPDU to the previously-stored (from step 34) PPC for that neighboring node, that is, the comparison is to the PPC value as earlier stored in the receiving bridge node's neighbor-tracking table. In other words, recall that the receiving bridge node in an earlier occurrence of step 34 from FIG. 2 stored in its own neighbor-tracking table a PPC value (and root node ID) originally communicated to the neighbor node. Thus, in step 44, the receiving bridge node consults this very table to compare that earlier-stored PPC value, earlier given to and thereby attributed to the neighbor node, with the value now received from that neighbor node. Further to the preferred embodiment, if the presently-received PPC value is less than the corresponding neighbor-tracking table PPC value, then the lower PPC value represents an instance whereby a spanning tree change could be triggered; in other words, the neighbor node is presently transmitting what in effect is a proposed reduction in PPC, which typically could trigger a spanning tree re-convergence as nodes will seek to optimize paths to take advantage of the overall lower PPC that is seemingly now available. If such a proposal is proper, then certainly it would be advantageous to act on it, but it is improper, then it might unnecessarily cause spanning tree changes and indeed give authority where true authority is undesired. As a result, when step 44 makes its PPC comparison, if the presently-received PPC value is less than the corresponding neighbor-tracking table PPC value, then step 44 forwards the control of method 40 to step 46, whereas if the presently-received PPC value is equal to or greater than the corresponding neighbor-tracking table PPC value, then step 44 forwards the control of method 40 to step 48. Both alternative resulting steps 46 and 48 are discussed later.

In a second query, step 44 at the BPDU-receiving node compares the root node ID in the received BPDU to the root node ID for that neighboring node as stored in the receiving bridge node's neighbor-tracking table. Recall that the root node ID for that neighboring node and stored in the receiving bridge node's neighbor-tracking table is stored in a previous occurrence of step 34 of FIG. 2, or, alternatively, if a if a legitimate change has been made to the root ID via a network administrator or the like, then in the preferred embodiment during that process each bridge node updates its neighbor-tracking table with the changed ID and corresponding to its neighboring node. In any event, in step 44, the receiving bridge node consults this very table to compare that earlier-stored root node ID value with the value now received from that neighboring node. Further to the preferred embodiment, if the two node values differ, then this too represents an instance whereby a spanning tree change could be triggered. Accordingly, if the BPDU-received root node ID value differs from the corresponding one in the neighbor-tracking table, then step 44 forwards the control of method 40 to step 46. Conversely, if the compared root node ID values are the same, then step 44 forwards the control of method 40 to step 48.

In step 46, having been reached due to either a detected reduction in PPC or a change in root node ID, the receiving bridge node requests from the sending neighboring node an authority check, where that authority check is preferably satisfied through network server NS. Thus, in response to this authority check request, the same port of the bridge node that transmitted the BPDU which caused the discernment in step 44 is now requested to prove its authority by communicating with network server NS and providing some form of authentication which presumably network server NS will provide to that bridge node only if that bridge node port is properly verified within system 10 or 10'. For example, such authentication may come in the form of providing a network key or authority token. Thus, following the authority request from step 46, method 40 continues to step 50.

Step 50 represents a wait state for the bridge node that issued the authority request in step 46, wherein after some period of time step 50 determines whether a valid authority has been returned by the port that was sent the request in step 46. If the authority is not received, then method 40 continues from step 50 to step 52. If the authority is received, then method 40 continues from step 50 to step 54.

Step 52, having been reached because the authority requested in step 46 is not properly returned, represents a preferred reaction to that lack of authority. Specifically, in step 52, an alarm is issued to indicate to a network manager or the like that a suspicious BPDU was received (in the earlier step 42). In addition, note that step 52 indicates that the received BPDU is prevented from being forwarded onward within system 10 or 10'. Thus, in addition to the alarm the network manager may be informed of various details with respect to the BPDU at issue, and he or she is likewise informed that the BPDU was not forwarded onward within the spanning tree at issue. After step 52, method 40 returns to step 42, that is, the receiving bridge node that just received the BPDU, determined it to be suspicious, reported an alarm, and did not forward it, then returns to a wait state whereupon it may receive a next BPDU and act consistent with the steps of method 40 based on the spanning tree parameters in that next BPDU, with this type of operation repeating for all bridge nodes in system 10 or 10' and for future relevant BPDUs.

Returning now to step 48, recall that it is reached when step 44 is not satisfied, that is, when the received BPDU does not include a lower PPC of the sending neighboring bridge node or a change in the root node ID. In step 48, the receiving node updates the value of the PPC of the sending neighboring bridge node as stored in the receiving bridge node's neighbor-tracking table. In other words, recall that method 20 of FIG. 2 establishes a neighbor-tracking table for each bridge node, wherein a given bridge node stores the PPC of any neighboring node. Thus, noting that step 44 is reached when a larger (or same) PPC value is indicated in a BPDU by a transmitting neighboring bridge node, then the receiving neighboring bridge node thus updates its stored PPC value for that transmitting neighboring bridge node. Next, method 40 continues from step 48 to step 54.

In step 54, having been reached either after step 48 or a positive determination to step 50, each bridge node operates to permit a normal spanning tree protocol ("STP") convergence. Thus, the BPDU that was received by a bridge node in step 42 and that gave rise to a negative determination in step 44, or one for which authority has been returned via step 50, will be forwarded on by the receiving bridge node, and other nodes will respond as per STP technology. Moreover, note that the convergence process may recreate links so that method 20 in invoked whereby new values of the root ID as well as PPC values are stored in various neighbor-tracking tables. Thereafter, method 40 returns to step 42 whereupon each bridge node, after convergence, again awaits another BPDU and method 40 repeats in the manner described above.

To further appreciate method 40, a few examples of its application are now considered. Note that such examples are not intended to be exhaustive, but they demonstrate the flexibility and benefits of various aspects of the preferred embodiment inventive scope. Thus, consider the following cases: (i) a legitimate new bridge joins the network; (ii) a new link is added to the network, including a failed link recovery; or (iii) an illicit STP attack. Each of these examples is further explored below.

When a legitimate new bridge joins network system 10 or 10' and per the above-discussed preferred embodiment, the new bridge issues a BPDU from its port along the link that connects it to the system. For example in system 10' of FIG. 3, when bridge node $BRN_5$ joins system 10', it transmits a BPDU to port $BP_{2.4}$ of bridge node $BRN_2$. As a new bridge, node $BRN_2$ will not as of yet assert its PPC or a root node ID and, thus, when bridge node $BRN_2$ applies step 44 to the received BPDU, neither the PPC nor the root ID will be implicated and, hence, flow continues to step 48. Since no new PPC is provided in the present BPDU, method 40 continues to step 54, where the normal convergence is to pass the BPDU of the new node (i.e., $BRN_5$) toward the root node. Once that BPDU reaches the root node, the root node determines the PPC for the newly-joining node and that information along with the root node ID is returned to the new node. Thus, in this example, method 40 does not affect or deter from normal creation of a new network link. Moreover, as that newly-determined PPC is returned to the requesting node (e.g., $BRN_5$), then per step 34 of method 20 the authenticator bridge node (e.g., $BRN_2$) will store that PPC value into the entry of its own neighbor-tracking table and corresponding to the requesting node, while also transmitting this information to that requesting neighboring node. Thus, for future purposes, the neighbor-tracking table is updated for purposes of later analysis of an additional BPDU received by the authenticator bridge node from its neighboring bridge node.

When a new link is added to the network and per the above-discussed preferred embodiment, the operation is similar to that for a new node, although the BPDU may already include an identification of the root node ID. In this case, assuming the desired new link is sought properly and legitimately, then when step 44 is performed by the neighboring node that receives the request to establish the new link, the BPDU-identified root node ID should match that known to the receiving neighboring node. Thus, again step 44 is answered in the negative, so flow continues to step 48. Since no new PPC is provided in the present BPDU, method 40 continues to step 54, where the normal convergence is to pass the BPDU of the new link toward the root node. Once that BPDU reaches the root node, per step 32 of method 20 the root node determines the PPC for the newly-joining link and that information along with the root ID is returned to that node. Thus, also in this example, method 40 does not affect or deter from normal creation of a new network link. Moreover, as with the preceding example, as that newly-determined PPC and the root node ID are returned to the new-link requesting node, then per step 34 of method 20 the authenticator bridge node will store those PPC and root node ID values into the entries of its own neighbor-tracking table and corresponding to the requesting node's link, while also transmitting this information to that requesting node.

When a wrongdoer seeks unauthorized access at the bridge node level, chances are that the entity will issue a BPDU which purports to present a very low PPC or a change in the root node ID; this may be the case if the wrongdoer is attempting to influence future network traffic to come to it as a path to, or as the actual, root node. When such a BPDU is issued, however, the receiving neighboring node will apply method 40 and step 44 will be answered in the affirmative. Thus, the receiving neighboring node will then request authority from the nefarious transmitting neighboring node and, assuming the latter cannot provide such authority, then an alarm will be issued by the receiving node and the BPDU is not forwarded on so that it will not otherwise affect or disturb the remainder of system 10 (or 10'). Thus, such alarms may be monitored, such as by having them stored in a log or the like and further efforts can then be taken to ensure the network integrity and to eliminate undesirable access to the network.

From the above, one skilled in the art should appreciate that the preferred embodiments provide a bridged computer network with an improved detection of certain abnormalities such as in a network spanning tree. Certain benefits are an improved detection and prevention of unauthorized efforts to change spanning tree configuration. Other benefits are reporting of unauthorized efforts to change spanning tree configuration. Still other benefits include spanning tree convergence and normal operation when legitimate changes are sought to a network configuration, such as the addition of a new bridge node or a bridge link. As still other benefits, various of the drawbacks of other prior art approaches are minimized or avoided. These benefits as well as others will be appreciated by one skilled in the art. Indeed, as a final benefit, while the present embodiments have been described in detail, various substitutions, modifications or alterations could be made to the descriptions set forth above without departing from the inventive scope which is defined by the following claims.

The invention claimed is:

1. A bridged network system, comprising: a plurality of bridge nodes;
  wherein each bridge node in the plurality of bridge nodes is connected to communicate with at least one other neighboring bridge node in the plurality of nodes; and wherein each bridge node in the plurality of bridge nodes comprises; circuitry for communicating with at least one of either another bridge node in the plurality of nodes or a network server; and circuitry for storing, as received from the at least one of another bridge node in the plurality of nodes and the network server, at least one spanning tree parameter of a neighboring bridge node;
  wherein each bridge node in the plurality of bridge nodes is programmed to perform the steps of; receiving a first control message from a neighboring bridge node port; transmitting to a network server a message in response to the first control message; receiving a response from the network server, wherein the response comprises the at least one spanning tree parameter of the neighboring bridge node; storing the at least one spanning tree parameter of the neighboring bridge node in a table that corresponds the at least one spanning tree parameter to the neighboring bridge node port; and communicating the at least one spanning tree parameter to the neighboring bridge node port;

wherein each bridge node in the plurality of bridge nodes is further programmed to perform the steps of: receiving a second control message from a neighboring bridge node port, wherein the second control message comprises at least one specified spanning tree parameter; and comparing the at least one specified spanning tree parameter to a previously-stored value that corresponds to the neighboring bridge node port; and wherein each bridge node in the plurality of bridge nodes is further programmed to perform, after the comparing step and in response to the comparing step making a first determination, requesting from the neighboring node an authority check.

2. The system of claim 1 wherein the at least one spanning tree parameter comprises a root node ID.

3. The system of claim 1 wherein the at least one spanning tree parameter comprises an efficiency measure of the cost of transmitting along a path from the neighboring node to a selected node in the plurality of nodes.

4. The system of claim 3 wherein the selected node comprises a root node.

5. The system of claim 1 wherein the at least one spanning tree parameter comprises a root node ID.

6. The system of claim 1 wherein the at least one spanning tree parameter comprises an efficiency measure of the cost of transmitting along a path from the neighboring node to a selected node in the plurality of nodes.

7. The system of claim 1 wherein the authority check is required via the network server.

8. The system of claim 1 wherein each bridge node in the plurality of bridge nodes is further programmed to perform, after the requesting step, the step of issuing an alarm if an authority indication is not received from the neighboring node.

9. The system of claim 1 wherein each bridge node in the plurality of bridge nodes is further programmed to perform, after the requesting step, the step of preventing a forwarding to any other node in the system of the second control message if the authority is not received from the neighboring node.

10. The system of claim 1 wherein each bridge node in the plurality of bridge nodes is further programmed to perform, after the requesting step, the steps of: issuing an alarm if an authority indication is not received from the neighboring node; and preventing a forwarding to any other node in the system of the second control message if the authority is not received from the neighboring node.

11. The system of claim 1 wherein each bridge node in the plurality of bridge nodes is further programmed to perform, after the requesting step, the step of forwarding to another bridge node in the system the second control message if the authority is received from the neighboring node.

12. The system of claim 1 wherein each bridge node in the plurality of bridge nodes is further programmed to perform, after the comparing step and in response to the comparing step making a second determination, updating from the second control message the at least one spanning tree parameter of the neighboring bridge node in the table.

13. A bridge node for use in a bridged network system comprising the bridge node as one of a plurality of bridge nodes, wherein each bridge node in the plurality of bridge nodes is connected to communicate with at least one other neighboring bridge node in the plurality of nodes, the bridge node comprising: circuitry for communicating with at least one of either another bridge node in the plurality of nodes or a network server; and circuitry for storing, as received from the at least one of another bridge node in the plurality of nodes and the network server, at least one spanning tree parameter of a neighboring bridge node;

wherein the bridge node is programmed to perform the steps of: receiving a first control message from a neighboring bridge node port; transmitting to a network server a message in response to the first control message; receiving a response from the network server, wherein the response comprises the at least one spanning tree parameter of the neighboring bridge node; storing the at least one spanning tree parameter of the neighboring bridge node in a table that corresponds the at least one spanning tree parameter to the neighboring bridge node port; and communicating the at least one spanning tree parameter to the neighboring bridge node port;

wherein the bridge node is further programmed to perform the steps of: receiving a second control message from a neighboring bridge node port, wherein the second control message comprises at least one specified spanning tree parameter; and comparing the at least one specified spanning tree parameter to a previously-stored value that corresponds to the neighboring bridge node port; and wherein the bridge node is further programmed to perform the step of, after the comparing step and in response to the comparing step making a first determination, requesting from the neighboring node an authority check.

14. The bridge node of claim 13 wherein the at least one spanning tree parameter comprises a parameter selected from a set comprising a root node ID and an efficiency measure of the cost of transmitting along a path from the neighboring node to a selected node in the plurality of nodes.

15. A bridge node for use in a bridged network system comprising the bridge node as one of a plurality of bridge nodes, wherein each bridge node in the plurality of bridge nodes is connected to communicate with at least one other neighboring bridge node in the plurality of nodes, the bridge node comprising: circuitry for communicating with at least one of either another bridge node in the plurality of nodes or a network server; and circuitry for storing, as received from the at least one of another bridge node in the plurality of nodes and the network server, at least one spanning tree parameter of a neighboring bridge node; and wherein the bridge node is programmed to perform the steps of: receiving a first control message from a neighboring bridge node port; transmitting to a network server a message in response to the first control message; receiving a response from the network server, wherein the response comprises the at least one spanning tree parameter of the neighboring bridge node; storing the at least one spanning tree parameter of the neighboring bridge node in a table that corresponds the at least one spanning tree parameter to the neighboring bridge node port; communicating the at least one spanning tree parameter to the neighboring bridge node port; receiving a second control message from a neighboring bridge node port, wherein the second control message comprises at least one specified spanning tree parameter; comparing the at least one specified spanning tree parameter to a previously-stored value that corresponds to the neighboring bridge node port; after the comparing step and in response to the comparing step making a first determination, requesting from the neighboring node an authority check; and wherein the at least one spanning tree parameter comprises a parameter selected from a set comprising a root node ID and an efficiency measure of the cost of transmitting along a path from the neighboring node to a selected node in the plurality of nodes.

16. The bridge node of claim 15 wherein the bridge node is further programmed to perform, after the requesting step, the steps of: issuing an alarm if an authority indication is not received from the neighboring node; and preventing a forwarding to any other node in the system of the second control message if the authority is not received from the neighboring node.

* * * * *